Patented Apr. 1, 1941

2,236,930

UNITED STATES PATENT OFFICE 2,236,930

WATER CLARIFICATION PROCESS

Johannes Wilhelmus Huijbert Uytenbogaart, The Hague, Netherlands, assignor to Shell Development Company, San Francisco, Calif., a corporation of Delaware No Drawing. Application November 21, 1939, Serial No. 305,497. In the Netherlands November 23, 1938

6 Claims. (Cl. 210—2)

This invention relates to the purification of water and deals particularly with an improved method for clarifying water containing impurities in suspension. It provides a new and more economical method whereby such impurities may be removed and pure clear water obtained. While not limited thereto, the process of the invention is particularly adapted to the clarification of industrial water, especially waste water from industrial plants, such, for example, as water that has been used for removing dust, carbon and the like from gases, water from mines and operations connected therewith, particularly water from flotation processes, water from laundries and bleacheries, water that has been used in the starch and beet sugar industries, waters containing humic acids, sewage water, etc.

One object of the invention is to reduce the time required for settling of materials responsible for the turbidity of water. Another object is to convert suspended impurities in water into compact, coherent floc particles which have a high sedimentation rate and give longer effective life of filtration media. Still another object is to reduce the consumption of chemicals required for clarification of turbid waters. It is a further object of the invention to provide a simple method whereby the capacity of established water clarification plants may be materially increased without further capital expenditures. It is also an object to introduce a new class of flocculating agents which are more efficient than those previously employed.

General practice in the clarification of turbid waters is to add a coagulant capable of flocculating the suspended impurities, then allow the mixture to settle in large sedimentation basins and finally remove the remaining suspended material by filtration, for example, through sand filter beds. The most commonly used coagulant is alum, but sodium aluminate, ferric chloride and mixtures of ferrous sulphate with lime and alum or ferric sulphate with small amounts, for example 5%, of activated carbon are also used. In order to obtain suitable floc particles with such coagulants it is necessary to exercise great care in mixing, particularly with respect to the degree, violence, and time of agitation and to carefully control the pH of the water. Neglect of any of such factors may result in poor coagulation by the commonly used coagulants resulting in a poorly coagulated floc which will either pass through the filters or clog them due to insufficient sedimentation. Even under the best conditions these coagulants produce floc particles which are relatively slow settling so that large clarification and settling tanks must be used if commercial quantities of water are to be treated. Furthermore the floc particles obtained are rather easily dispersed and may be broken up again in pumping the mixture to the settlers.

Now it has been found that by the use of suitable compounds having a capillary active onium group as coagulants for flocculating impurities suspended in water, the foregoing difficulties may be materially reduced or eliminated and a better and more rapid flocculation and settling may be obtained in a simple, easily applied manner.

As suitable onium compounds which may be used in the invention are included, for example, capillary active ammonium, arsonium, iodonium, oxonium, phosphonium, piperidonium, pyridonium, selenonium, stannonium, stibonium and sulphonium compounds. Because of their lower cost ammonium and sulphonium compounds are most economical at present. Preferred onium compounds are those devoid of anion-active groups as it has been found that such groups tend to nullify the advantageous flocculating properties of cation-active onium compounds. Thus, for example, cetyl pyridonium naphthenate is relatively inactive as a flocculating agent for the purification of water compared with the preferred onium compounds.

In general onium compounds having in the cation a hydrophobe group which contains at least six, and more preferably at least nine, carbon atoms in a straight chain are preferred. But onium compounds containing in the cation an aryl, arlkyl, alkaryl, alicyclic or cycloaliphatic group having equivalent surface active properties may also be used. Such compounds may be saturated or unsaturated and may or may not contain substituents such, for example, as halogen atoms. In general onium compounds having in the cation a primary hydrophobe group are preferred, but those containing the corresponding secondary or tertiary groups may be used. Among the preferred alky chain-containing onium compounds, for example, it has been found that when using pure individual compounds the best coagulation is obtained with those in which the alkyl group is primary and has 15 to 25 carbon atoms in a straight chain. Those having a secondary alkyl group attached at a carbon atom in the 15th to 25th position from the end of the chain also are highly effective.

The flocculation may be effected with pure individual onium compounds of the types described or with mixtures of pure or substantially pure onium compounds or with mixtures comprising one or more such onium compounds with other materials which may behave as diluents or may have an advantageous influence in the treatment to which the mixture is being applied. Where mixtures of onium compounds are used different types of onium compounds or mixtures of homologous onium compounds of the same type may be employed. The use of mixtures of onium compounds offers some advantage in certain cases since mixtures of homologous onium compounds of a given average molecular weight have about the same flocculating power as that of a corresponding onium compound of higher molecular weight when the latter is employed in a pure form. Thus, for example, a mixture of di-methyl secondary alkyl sulphonium methyl sulphates in which the secondary alkyl groups contained ten to eighteen carbon atoms and averaged about 12.6 carbon atoms was found to be almost as effective in clarifying a coal suspension of mine waste water as an equal amount of the corresponding secondary hexadecyl compound used in a pure form.

Typical onium compounds which are effective coagulants in the process of the invention include, for example, sulphonium compounds such as di-methyl cetyl sulphonium methyl sulfate, methyl ethyl cetyl sulphonium methyl sulphate, diethyl cetyl sulphonium ethyl sulphate, dimethyl heptadecyl sulphonium isopropyl sulfate, dimethyl stearyl sulphonium methyl sulphate, dimethyl ceryl sulphonium methyl sulphate, dimethyl pentadecyl sulphonium methyl sulphate, methyl isopropyl myristyl sulphonium methyl sulphate, methyl ethyl lauryl sulphonium methyl sulphate, di-methyl oleyl sulphonium methyl sulphate and homologues and isomers thereof such, for example, as sulphonium sulphates corresponding to the foregoing compounds in which the long chain primary alkyl groups have been replaced by secondary alkyl groups such, for example, as secondary hexadecyl, secondary octadecyl, secondary nonadecyl and the like preferably attached to the sulphonium sulphur atom at a carbon atom at least 9, and more preferably at least 15 carbon atoms from the end of the chain. Instead of sulphonium alkyl sulphates the corresponding sulphonium sulphonates, as diethyl cetyl sulphonium ethyl sulphonate, diethyl cetyl sulphonium toluol sulphonate and the like or other suitable sulphonium derivatives such, for example, as any of the foregoing or related sulphonium alkyl sulphates in which the alkyl sulphate group has been replaced by another negative group as halogen, $NO_3$, $OH$, $CH_3COO$, etc. Another type of onium compound which may be used is the aluminates of capillary active onium compounds which may be formed, for example, by anion exchange between suitable capillary active onium salts, e. g. acetates, and sodium aluminate.

While sulphonium compounds have been described in some detail in order to illustrate the diverse types of groups and radicals which may be present in the onium compound or compounds used in the improved water clarification process of the invention, it will be understood that the invention is not limited thereto but that other onium compounds such as capillary active ammonium compounds as diethyl benzyl cetyl ammonium chloride, dimethyl ethyl cetyl ammonium ethyl sulphate, heptadecyl pyridonium sulphate, the oleic acid ester of ethanol pyridonium chloride and the like, for example, and phosphonium compounds such as triethyl cetyl phosphonium ethyl sulphate and the like may also be used. Suitable methods for producing sulphonium and ammonium compounds which may be used in the process of the present invention are described in copending applications Serial No. 218,632, filed July 11, 1938; Serial No. 220,130, filed July 19, 1938; and Serial No. 251,032, filed January 14, 1939.

Even when added to the water to be purified in only very small amounts, for example, in quantities of fractions of hundredths per cent, there onium compounds produce very efficient clarification and give floc particles which settle rapidly and are not easily dispersed. As a result the clarification of waste water and the like is much simplified when carried out with capillary active onium compounds as the flocculating agent. While, as a rule, the rigid pH control formerly necessary is not required where onium compounds are used, it is usually desirable to avoid high alkalinity, particularly when using sulphonium sulphates and the like which have decreased flocculating power at pH 11 for example. Also in order to obtain good coagulation the mixing conditions are not so severely limited when onium compounds are used as where alum and the like is employed, but it is of course advantageous to provide for uniform distribution of the onium compound in the water in order that minimal amounts may be effective.

If desired the process of the invention may be carried out in conjunction with the addition of other suitable water treating agents including other coagulants for suspended matter or absorptive agents such as special starches and the like which promote the clotting of flocculating particles or active carbon, or water softening agents and the like. The process may be carried out batchwise or intermittently as well as continuously and ordinary or elevated temperature treatment may be used.

In a typical example of the application of the process of the invention waste water from a coal mine was clarified. At this mine the coal is washed and a flotation treatment is used to separate the combustible substances of the coal slurry from the finely dispersed gang, giving a waste water which is dark gray and contains 2–3% of suspended solids consisting of very fine coal dust mixed with clay, pyrite, calcite, etc., only part of which solids can be separated by mechanical means. After adding 20 grams of dimethyl cetyl sulphonium methyl sulphate per cubic meter of waste water, an average settling time of only 15 minutes of the water was required for complete clarification without any filtration. Reducing the amount of dimethyl cetyl sulphonium methyl sulphate to only 10 milligrams per liter gave clear water when filtration was applied after settling. With the same waste water the following onium compounds, listed in the order of their activity, were found to give good clarification; tri-ethyl cetyl ammonium ethyl sulphate, triethyl cetyl phosphonium ethyl sulphate, cetyl pyridonium bromide, di-methyl secondary $C_{10}$–$C_{18}$ alkyl sulphonium methyl sulphate mixture and dimethyl second $C_6$–$C_9$ alkyl sulphonium methyl sulphate mixture. The sulphonium sulphate mixtures were those produced by reacting the mixture of methyl sulphides obtainable from $C_{10}$–$C_{18}$ and $C_6$–$C_9$ fractions of cracked wax olefins, i. e. straight chain olefines having the double bond at or near the end of the chain, with dimethyl sulphate.

The process of the invention offers many advantages. Since it requires the addition of only small amounts of coagulating agents it yields sludges which are less contaminated with foreign material and easier to purify than formerly was the case. This is particularly advantageous where waters from gas scrubbing plants in which valuable materials are being recovered, as for example, smelter gases and the like, are being treated. In such cases it may be desirable to add the onium compound to the scrubbing water prior to the scrubbing operation. Still other variations in the invention may be made. Thus while the advantages of rapid settling have been emphasized, it is feasible to dispense with settling and to effect separation of the flocculated material by filtration or centrifugation only, particularly as the process gives filter cakes which are easier to handle and wash than formerly. It will therefore be understood that the invention is not limited to the details of operation disclosed by way of illustration nor by any theory advanced in explanation of the improved results obtained, but only by the appended claims.

I claim as my invention:

1. A process for purifying water containing suspended solids which comprises adding thereto a small amount of a capillary active lower dialkyl cetyl sulphonium salt of a lower alkyl sulphuric acid ester and separating the resulting flocculated impurities.

2. A process for purifying water containing suspended solids which comprises adding thereto a small amount of a capillary active sulphonium lower alkyl sulphate having a primary alkyl group containing at least 15 carbon atoms in a straight chain directly attached to the sulphonium sulphur atom and separating the resulting flocculated impurities.

3. A process for purifying water containing suspended solids which comprises adding thereto a small amount of a capillary active sulphonium lower alkyl sulphate having an alkyl group containing at least 15 carbon atoms in a straight chain directly attached to the sulphonium sulphur atom and separating the resulting flocculated impurities.

4. A process for purifying water containing suspended solids which comprises adding thereto a small amount of a capillary active sulphonium compound devoid of anion-active groups and having in the cation a hydrophobe group which contains at least nine carbon atoms in a straight chain, and separating the resulting flocculated impurities.

5. A process for purifying water containing suspended solids which comprises adding thereto a small amount of a capillary active onium compound of the ammonium type devoid of anion-active groups and having in the cation a hydrophobe group which contains at least nine carbon atoms in an open chain, and separating the resulting flocculated impurities.

6. A process for purifying water containing suspended solids which comprises adding thereto a small amount of a capillary active onium compound devoid of anion-active groups and having in the cation a hydrophobe group which contains at least nine carbon atoms in an open chain, and separating the resulting flocculated impurities.

JOHANNES WILHELMUS
HUIJBERT UYTENBOGAART.